US011898379B2

(12) United States Patent
Wang et al.

(10) Patent No.: US 11,898,379 B2
(45) Date of Patent: Feb. 13, 2024

(54) PORTIONS OF A DEVICE; METHODS OF MAKING AND USING THEM

(71) Applicants: Lin Wang, Zhejiang (CN); Hexiao Wang, Zheijiang (CN); Peter Morello, Sr., Stuart, FL (US); Peter A. Morello, Jr., Stuart, FL (US)

(72) Inventors: Lin Wang, Zhejiang (CN); Hexiao Wang, Zheijiang (CN); Peter Morello, Sr., Stuart, FL (US); Peter A. Morello, Jr., Stuart, FL (US)

(73) Assignee: Hangzhou Timing Security Technologies Co., Ltd., Hangzhou (CN)

( * ) Notice: Subject to any disclaimer, the term of this patent is extended or adjusted under 35 U.S.C. 154(b) by 434 days.

(21) Appl. No.: 17/050,826

(22) PCT Filed: Apr. 27, 2018

(86) PCT No.: PCT/US2018/029867
§ 371 (c)(1),
(2) Date: Oct. 26, 2020

(87) PCT Pub. No.: WO2019/209325
PCT Pub. Date: Oct. 31, 2019

(65) Prior Publication Data

US 2021/0293052 A1 Sep. 23, 2021

(51) Int. Cl.

| | |
|---|---|
| ***E05B 73/00*** | (2006.01) |
| ***E05B 45/00*** | (2006.01) |
| ***E05B 47/00*** | (2006.01) |
| ***G08B 3/10*** | (2006.01) |
| ***G08B 13/14*** | (2006.01) |
| ***E05B 67/00*** | (2006.01) |
| *E05B 45/06* | (2006.01) |

(52) U.S. Cl.
CPC ........ *E05B 73/0011* (2013.01); *E05B 45/005* (2013.01); *E05B 47/0045* (2013.01); *E05B 67/006* (2013.01); *G08B 3/10* (2013.01); *G08B 13/14* (2013.01); *E05B 2045/064* (2013.01)

(58) Field of Classification Search
CPC .. E05B 45/005; E05B 45/06; E05B 2045/062; E05B 2045/064; E05B 2047/0094; E05B 2047/0095; E05B 67/00; E05B 67/003; E05B 67/006; E05B 73/00; E05B 73/0005; E05B 73/0011; G08B 3/10; G08B 13/14
See application file for complete search history.

(56) References Cited

U.S. PATENT DOCUMENTS

| | | | | |
|---|---|---|---|---|
| 7,522,048 B2 * | 4/2009 | Belden, Jr. ......... | G08B 13/1409 340/568.4 |
| 7,992,259 B2 * | 8/2011 | Goldstein ........... | E05B 73/0017 24/71 CT |
| 8,122,744 B2 * | 2/2012 | Conti ................. | G08B 13/1463 70/57.1 |

(Continued)

*Primary Examiner* — Christopher J Boswell
(74) *Attorney, Agent, or Firm* — Peter K. Trzyna, Esq.

(57) ABSTRACT

A first portion of a security device, the first portion configured to have a separate state with respect to a second portion and a combined state with respect to the second portion, such that when in the combined state, the first portion is mated, interlocked, and/or locked with the second portion to collectively form the security device.

27 Claims, 8 Drawing Sheets

(56) References Cited

U.S. PATENT DOCUMENTS

| | | | | |
|---|---|---|---|---|
| 8,368,543 | B2 * | 2/2013 | Yang | G08B 13/2434 340/572.1 |
| 9,169,670 | B2 * | 10/2015 | Shute | E05B 73/0017 |
| 9,394,727 | B2 * | 7/2016 | Fawcett | E05B 45/005 |
| 9,489,808 | B1 * | 11/2016 | Wang | G08B 21/18 |
| 10,180,017 | B2 * | 1/2019 | Ewing | E05B 73/0017 |
| 11,459,800 | B2 * | 10/2022 | Carreon | E05B 73/0029 |
| 2007/0146134 | A1 * | 6/2007 | Belden | G08B 13/2434 340/568.2 |
| 2012/0229975 | A1 * | 9/2012 | Yang | G08B 13/2434 361/728 |
| 2012/0318027 | A1 * | 12/2012 | Shute | E05B 73/0029 70/15 |
| 2016/0125712 | A1 * | 5/2016 | Napthine | E05B 45/005 340/568.2 |

* cited by examiner

Figure 8
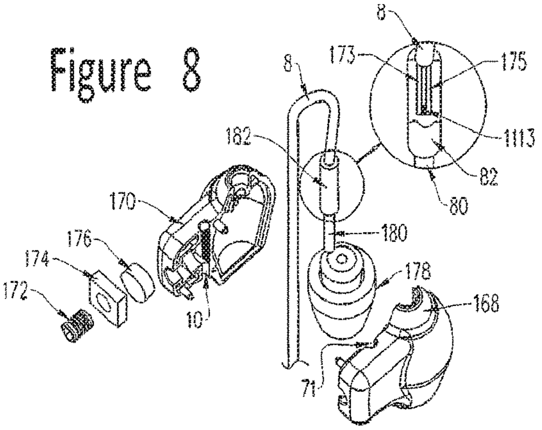
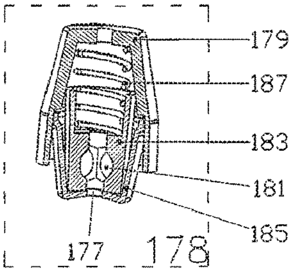
Fig 10
Fig 11
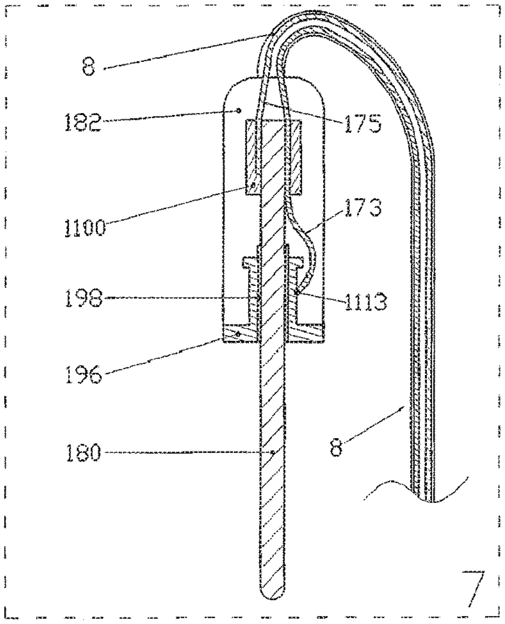
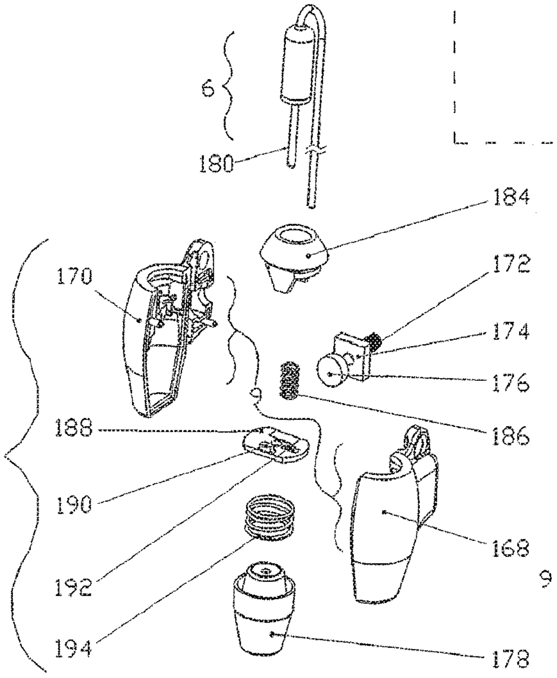
Fig 9
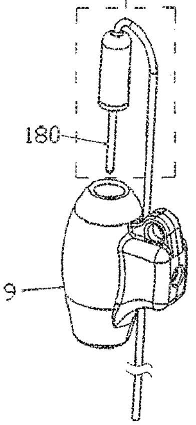
Fig 12
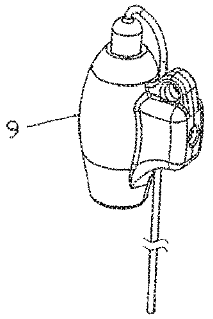
Fig 13

PORTIONS OF A DEVICE; METHODS OF MAKING AND USING THEM

TECHNICAL FIELD

Articles of manufacture, apparatuses, processes for using the articles and apparatuses, processes for making the articles and apparatuses, and products produced by the process of making, along with necessary intermediates. For example, the article or apparatus may be a device such as an alarm device, security tag, or the like.

TECHNICAL BACKGROUND

The technical background includes Chinese patents CN 200963017 Y, 206628044 U, 202795620 U and U.S. Pat. Nos. 9,489,808 and 9,711,032. Yet a need exists for an alternative to such as the foregoing.

DISCLOSURE

Portions of a device can address the aforesaid need and/or afford such as improved versatility, functionality, and/or situational capability. Relatedly, there can be processes of making and using the portions and/or the device.

Generally, a device can be configured in portions, the portions having a combined state and a separated state, e.g., each portion's state being defined with respect to another of the portion(s). In the combined state, the portions can be any combination of mated, interlocked, locked, and armed and not-armed. In some embodiments, one or more of the portions can have functionality independent from that of the combination of the portions, and in some embodiments, forming the states can afford functionality beyond joining, such as by blocking access to a component. In any of such implementations, there can be a technical effect of improved versatility, functionality, and/or alternative or situationally-improved capabilities over conventional approaches, and in any case a technical effect even if not expressly stated as such. The disclosure herein employs a security device as a way of teaching the foregoing principles and other principles discussed below, and thus these principles are not necessarily limited to such a device.

INDUSTRIAL APPLICABILITY

Industrial applicability is representatively directed to that of apparatuses and devices, manufacturing the foregoing and using them, including electrical devices, security systems, alarms, tags, consumer theft-protection apparatuses. Industrial applicability includes industries engaged in the foregoing, as well as industries operating in cooperation therewith, depending on the implementation.

DRAWINGS

FIG. 8 is an indication of components of a housing with a key.

FIG. 9 is another indication of components of the housing and the key.

FIG. 10 is an indication of components of a lock.

FIG. 11 is an indication of the key.

FIG. 12 is an indication the key external to the lock.

FIG. 13 is an indication of the key secured in the housing.

MODES

Figure 1:
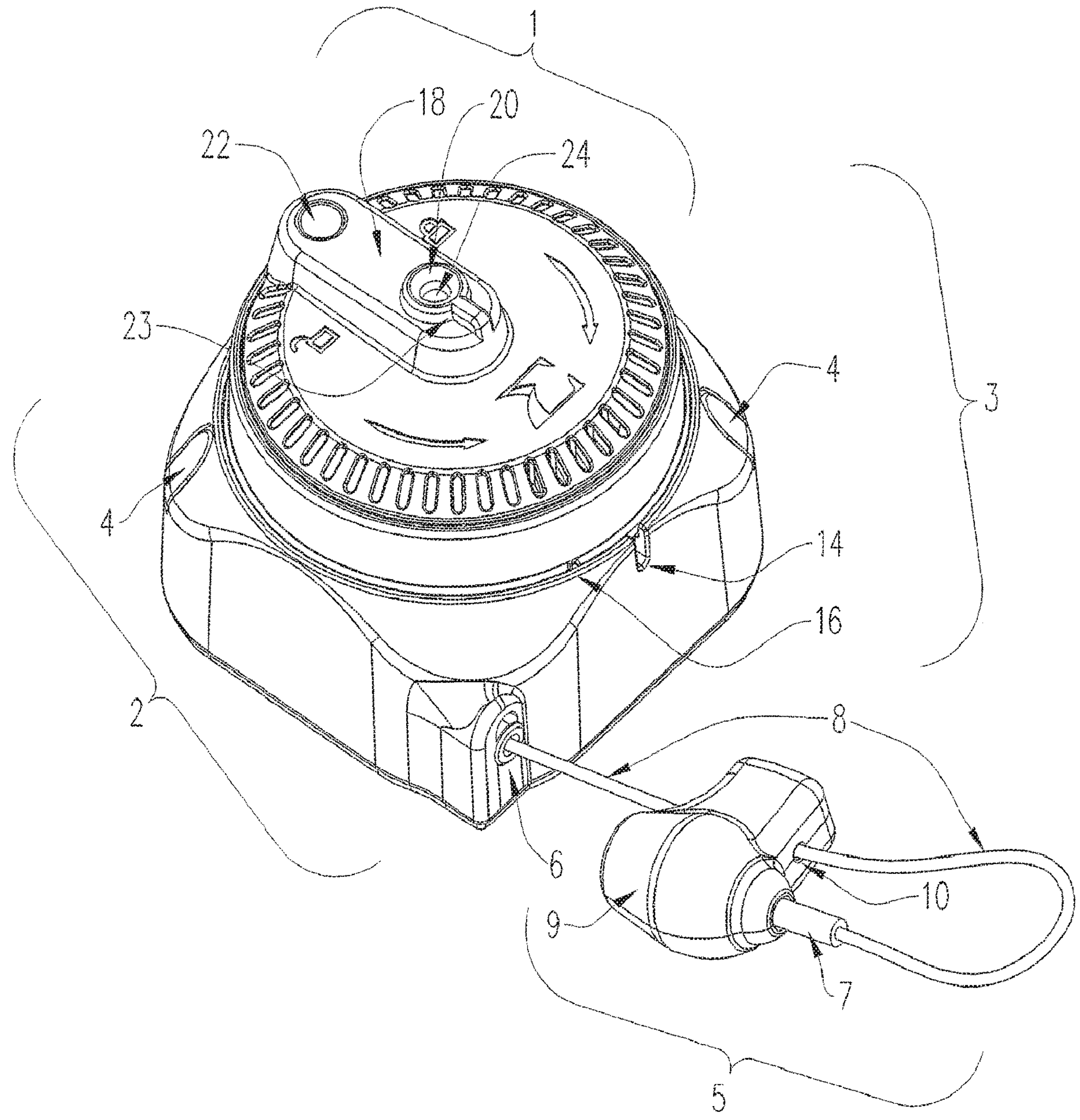
FIG. 1 is an indication of a perspective view of an embodiment, which in this nonlimiting illustration, indicates a combined state for a top (first) portion and a bottom (second) portion of a security device having an extension.

As mentioned above, the disclosure herein employs a security device or tag as a way of teaching the broader principles relating to portions configured to have separated and combined states with respect to each other, e.g., a first portion is configured to have a combined state and a separated state with respect to another of the portions; similarly, the other of the portions is configured to have the separated state and the combined state with respect to the first of the portions. Unless otherwise mentioned or apparent from the context, referring to one portion or another as the "first portion" or the "second portion" is arbitrary and not limiting.

Conceptually, there can be a first portion configured to mate with at least one other portion, e.g., be configured to connect or be connected mechanically to another portion. To illustrate the concept of being configured to connect or be connected mechanically to another portion, consider that a peg can be configured cylindrically to mate with a cylindrical void, e.g., the right diameter and depth. Additionally, or in the alternative if so desired, the first portion can be configured to interlock with at least one other portion, e.g., to become interconnected together or to engage by overlapping or by the fitting together of projections and recesses. To illustrate the concept of being interconnected together or engaged by overlapping or by the fitting together of projections and recesses, consider that a bolt can be configured to screw into a nut or pieces of a jigsaw puzzle can be configured to have pieces that fit together due to projections and recesses. Yet in addition, or in the alternative if so desired, the first portion can be configured to lock together. To illustrate the concept of being locked together, consider that a deadbolt can lock a door to a door frame or a safe door can be locked to a safe with a combination lock. Still further, or in the alternative if so desired, the first portion can be configured to have an armed and an unarmed state. To illustrate the concept of an armed and a disarmed state, consider a burglar alarm that can be turned ON to detect for an unauthorized intrusion, or turned OFF while the premises are otherwise guarded. These can be implemented individually or in any combination, depending on the embodiment that is desired for one application or another. Of course, the principles and devices herein are not limited to a peg in a hole, a screw, jigsaw puzzle pieces, a deadbolt lock, a combination lock, or an armed/unarmed—these are only illustrative teachings of principles.

As mentioned above, the portions can, but need not always, have can have functionality independent from that of the combination of the portions. For example, there can be a variety of types of the second portion, and the first portion can interchangeably connect to each of the types, and/or the second portion can have operational functionality that is enhanced when combined with the first portion.

Example 1 Now consider these concepts in an application toward the teaching example of a security device. A first portion of the security device can be configured to mate with another portion of the security device, e.g., mechanically, electrically, magnetically, etc. For example, consider that the first portion can be configured to have a plug-in or peg-like section that coincides with a cylindrical void-like section of another portion, e.g., the peg-like section can have a diameter and, if desired, a depth that fits into the cylindrical void-like section of the other portion. Another approach can be to have at least one tab on one portion can extend into a corresponding slot on another portion. In any case such case, the portions can be mechanically mated into a combined state.

If so desired, though not always necessary, these portions can be configured to interlock, e.g., screw together. So for illustrative purposes, after one portion is mated to another portion, the portions can be screwed together to interlock.

And if so desired, the portions can be configured to lock together, e.g., by a pin that must be moved to unlock the portions from each other. Note that the portions need not always first mate nor interlock, e.g., two flat surfaces can be locked together, such as by a magnetic lock.

And any of the foregoing portion(s) can be configured with alarm circuitry, such as that which detects a breach of an armed state, such as by detecting for an electrical change in the circuitry, e.g., occasioned by a broken circuit, tripped switch, etc. Indeed, if so desired for example, when the portions are in the combined state to cooperate, alarm circuitry can be configured to span the first portion and the second portion, thereby detecting for a breach of the armed state occurring in either or both of the portions, so as to trigger an alarm during a breach of the armed state.

The manner of combining any the foregoing state can in some cases provide additional functionality. For example, in the combined state, in some embodiments, the first portion can be combined with the second portion so as to block access in a functional way. For example, consider portions that, when combined, block access to one of the portion's compartment for battery replacement, thereby allowing access to the battery compartment to be secured during the locked, interlocked, and/or armed state.

Consider now the application of the foregoing concepts applied to portions configured to have a separated state, e.g., a state in which one portion is separated from another portion or portions but configured to mate, etc. into the combined state. In this separated state, the portions can be in an un-interlocked or a re-interlockable un-interlocked condition with respect to another portion or portions. If so desired, in this separated state, the portions can be in an unlocked or a relockable unlocked condition with respect to each other portion or portions. In some but not all embodiments, at least one of the portions can be operationally functional on its own, yet provide additional, alternative, or optional functionality in the combined state.

Example 2 To illustrate further, consider a second portion of the security device that emanates a tether to releasably attach a consumer product, as arranged for antitheft protection. In this teaching example, the second portion has no power and/or no alarm, but is securable (e.g., by a screw) to a surface to anchor the second portion as a security device and thus anchor the releasably attached consumer product. In this condition, the second portion is in the separated state with respect to the first portion is yet functional as a security device, devoid of one or more other portions. Nonetheless, as above, the second portion can be configured to mate, etc. with the first portion (or portions) that contains a source of power and an alarm, such that when the portions are in a combined state, the tether of the second portion becomes part of the circuitry of both portions, and the alarm sounds when the circuitry detects a breach of the armed state. Accordingly, at least one of the portions can be operationally functional on its own, yet provide additional, alternative, or optional functionality in the combined state. Also consider various types of the second portion, say, one providing a loop through a purse handle, another connecting to a computer, and yet another adhered to an object such as a bottle of perfume. The first portion can interchangeably function with each of the various types without the merchant having to purchase entire separate security devices or train employees to handle completely different security devices.

Example 3 Now consider another, somewhat related teaching example. Again, in some but not all embodiments, there can be a configuration in which the second portion emanates the tether to attach the consumer product, as arranged for antitheft protection. In this other teaching example, the second portion may or may not have power and/or an alarm, but is securable to a surface, e.g., by one or more screws. The second portion has a housing with a screw hole into which a screw can be inserted to carry out the securing of the second portion to the surface. But by providing the screw hole for the screw, the existence of the screw is visible after the securing, thereby indicating that the security device can be thwarted by unscrewing the device from the surface and stealing the device along with the consumer product attached thereto.

Consider further, though, that the housing also has a particular exterior curvature and color, and perhaps texture and/or pattern. A cap can be adapted to conform to particular exterior curvature, color, etc. of the housing to conceal the existence of the portal for the screw, and thus obscure the means for attaching the housing to the surface. And if an adhesive pad is also located between the housing and the surface, with the cap in place, it is not apparent whether the sole means of surface mounting is the adhesive pad, thereby affording improved versatility, functionality, and/or situational capability.

The cap can, if so desired, be located on a plug structured to fill the portion of each screw hole remaining after the screw has attached the housing to the surface, thereby having a combined state with the portion having the housing. For example, in some embodiments, the cap/plug arrangement can be simultaneously molded with the housing so as to blend in well with the housing and be breakably separable from the molded housing. Alternatively, the cap/plug arrangement can be produced separately. In any case, though, the cap/plug arrangement can be placed into the combined state with respect to the housing after the screw has mounted the device to a surface. The cap/plug arrangement can be configured to mate and/or interlock with the housing, and the housing can be configured to mate and/or interlock with the cap/plug arrangement. For example, the cap/plug arrangement fits into the portion of the portal remaining after the screw has mounted the security device to the surface and such that the cap blends with the exterior of the housing to conceal, (e.g., disguise, camouflage) the existence of the screw. These are thusly interconnected together or to engage by overlapping or by the fitting together of projections and recesses, thereby enhancing security by making it more difficult for a potential thief to determine how the security device is secured to the surface. When located in the portal. the cap/plug arrangement is in the combined state, and when not in the portal, is in the separated state. And the cap/plug (as the first portion) is removable and reinsertable to bring about the interlockable and un-interlocked re-interlockable states, e.g., for relocation of the security device to another surface.

Note that in such embodiments, unlike the screw used to attach the device to the surface, the cap or the cap/plug arrangement is especially made or especially adapted for use as a component or portion of the security device and not as a staple article or commodity for substantial other use. Also note that any combination of the teachings of Examples 1, 2, and 3 can be employed if so desired. Further note that when configuring the portions to mate, interlock, and/or lock, the portions can also be configured to not mate, interlock, and/or lock with other devices (to enhance security), e.g., a receptor for a remote control for the portions be configured to not mate with remote controls other than the remote control for the portions, as discussed further below.

The range of these teaching examples is to illustrates that many configurations are possible within the scope of the principles disclosed herein.

Turn now to FIG. 1 which illustrates teaching applications of these principles. There can be a first portion 1 and a second portion 2 of device 3, herein illustrated as a security device. The second portion 2 has in this case, at least one cap 4. In this teaching, the second portion 2 emanates an extension 5, such as a tether retractably extending through an eyelet 6. The tether may or may not include an electrical path, depending on the embodiment of interest. Eyelet 6 eases friction during extension and retraction of extension 5. In many embodiments, the second portion 2 emanates a flexible line that does not reconnect to either of the first portion 1 or the second portion 2 when locked and/or interlocked with the first portion. Likewise, in many embodiments the security device 3 is not a spider wrap security device.

As illustrated, extension 5 has a protrusion 7 adjacent to a flexible line 8, such as a tether. In some cases such as that illustrated in FIGS. 1, 16, and 17, extension 5 can include a flexible line 8 which provides a path of electrical conductivity as part of circuitry described below. The protrusion 7 can be inserted into a lock housing 9 to form a looping portion of the flexible line 8 in connection with a lock housing hole 10.

Figure 2:
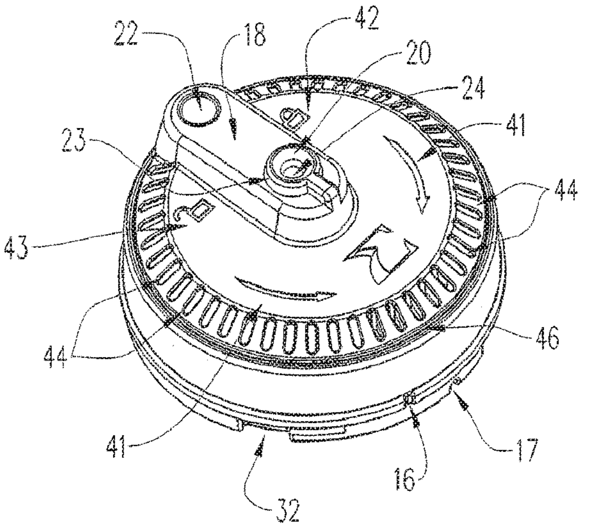
FIG. 2 is an indication of a perspective view of the top portion.
Figure 3:
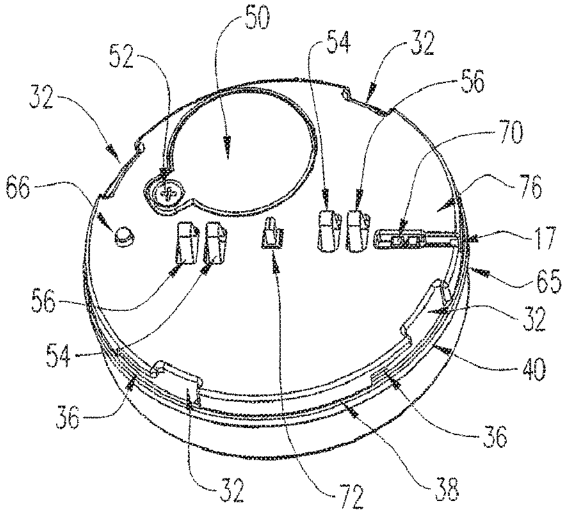
FIG. 3 is an indication of a perspective view of the underside of the top portion.
Figure 4:
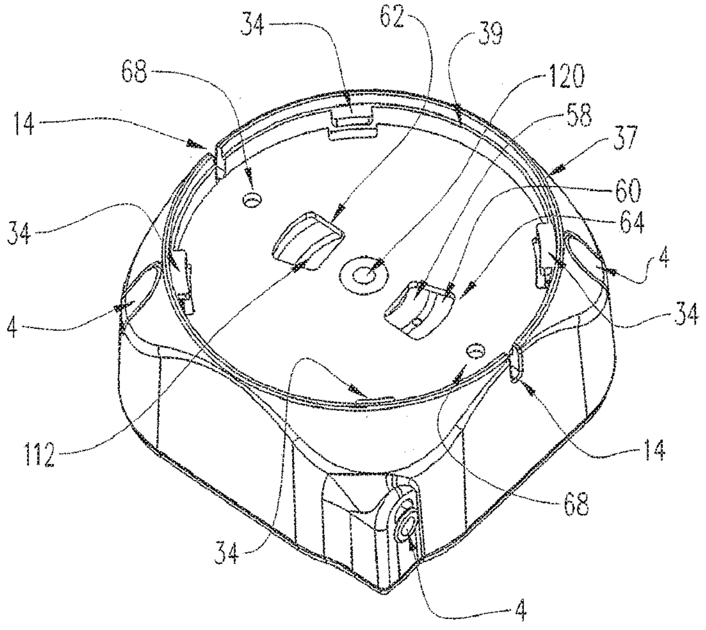
FIG. 4 is an indication of a perspective view of the bottom portion.

FIG. 2 illustrates the first portion 1 from a top perspective, and FIG. 3 illustrates the first portion 1 from a bottom perspective. FIG. 4 illustrates the second portion 2 from a top perspective. Note that in FIG. 4, extension 5, etc. is not illustrated, so as to indicate that other extensions, such as those in FIGS. 16 and 17, may be used. The second portion 2 can thereby be manufactured to accommodate more than one type of extension, and in some cases, different types of the second portion 2 can mate with the first portion 1, and in yet other cases, other types of first portion 1; indeed any of these portions can be configured to beinterchangeable with other portions.

Figure 5:
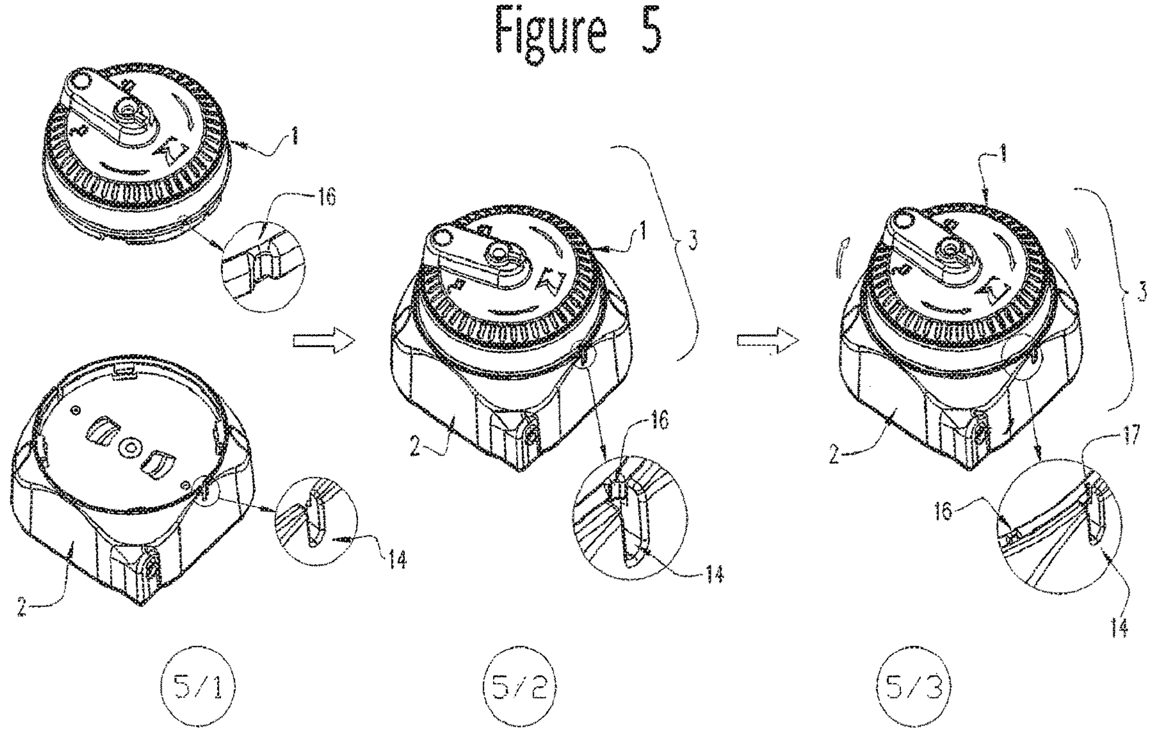
FIG. 5 is an indication of a process by which the portions can be changed into a combined state.
Figure 6:
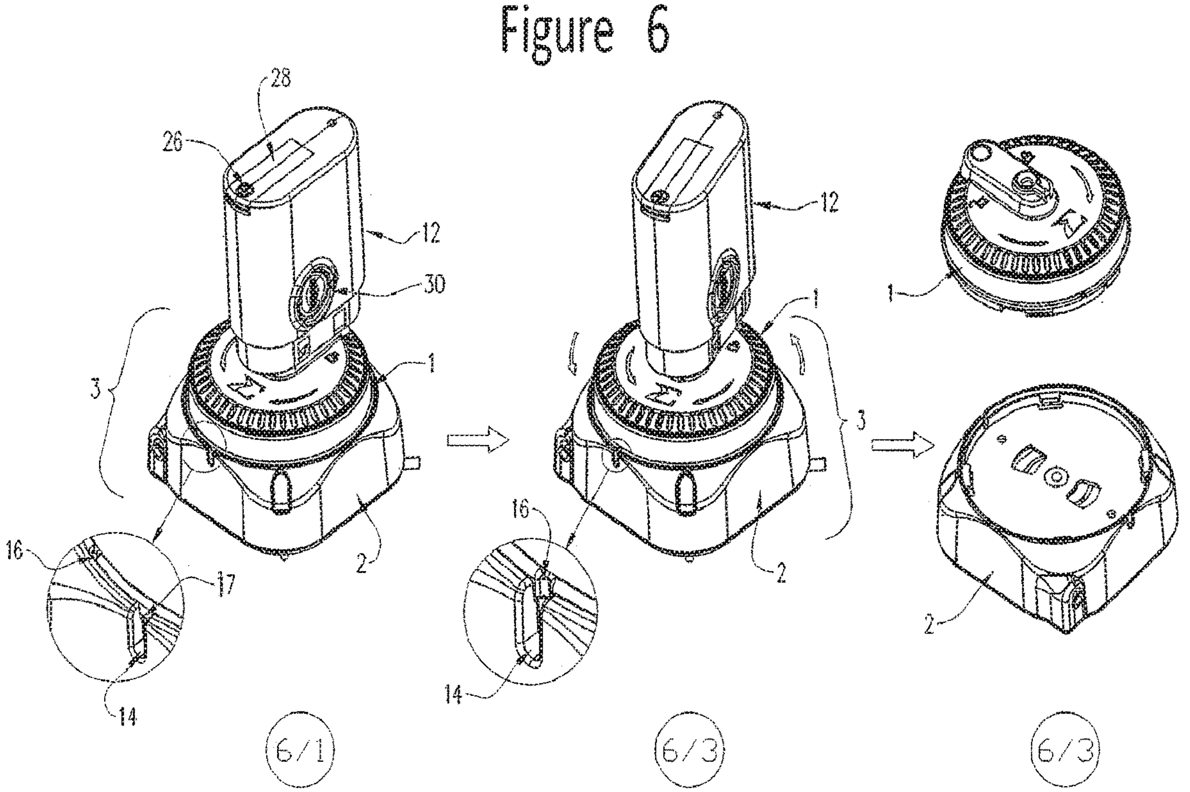
FIG. 6 is an indication of a process by which the portions can be changed into a separate state.

FIG. 5 is to exemplify that the portions 1 and 2 can be moved or brought from the separated state into the combined state. In FIG. 5, the first portion 1 can optionally be combined, e.g., mated and in some cases interlocked, and in some cases locked, with the second portion 2, via such steps as steps 5/1, 5/2, and 5/3. In step 5/1, the first portion 1 is in the separated state with respect to second portion 2. In this condition, each of the portions 1 and 2 is devoid of the other portion but configured so that the portions 1 and 2 have a combined state. In step 5/2, the first portion 1 is moved or brought into contact with the second portion 2 so as to be mechanically mated. In interlocking embodiments such as that which is illustrated in FIGS. 5 and 6, in step 5/3, rotational motion is imparted with respect to the first portion 1 and the second portion 2 to screw the portions together, i.e., a combined state having an interlocked condition. In locking embodiments, as discussed below and illustrated in FIGS. 5 and 6, at least one lock (not shown in FIG. 5) can lock the portions 1 and 2 together, i.e., a combined state having mated, interlocked, and locked conditions.

FIG. 6 is to exemplify that the portions 1 and 2 can be changed from the combined state into the separated state, e.g., be de-mated, and in some cases be de-interlocked, and in some cases, be unlocked from the first portion 1, via such steps as steps 6/1, 6/2, and 6/3. In step 6/1, commencing from the combined state having the mated, interlocked, and locked conditions, a remote control 12, such as a magnet, an emitter of broadcast energy, or both, can be applied to unlock the above-mentioned and later-described lock. In step 6/2, rotational motion can be effectuated with respect to the first portion 1 and the second portion 2 to de-interlock (e.g., unscrew) the portions 1 and 2. In step 6/3, the first portion 1 and the second portion 2 are no longer mated and are in a separated state, but re-matable, re-interlockable, and re-lockable as per FIG. 5.

Returning to FIG. 1, note that second portion 2 can, if so desired, have a notch 14, and first portion 1 can, if so desired, have a marker 16. The notch 14 and the marker 16 can be located to indicate an alignment of the first portion 1 and the second portion 2, such as for contacting them as in step 5/2 of FIG. 5. Imparting the rotational motion with respect to the first portion 1 and the second portion 2, rotates the marker 16 from initial alignment with the notch 14 into an unaligned location, during the combined, interlocked and/or locked condition. The rotating also can yield an alignment of the notch 14 and entrance 18, which can but need not always be a hole or slot located to dispose a switch while in the combined state, especially in the interlocked and/or locked condition, but in some cases, out of alignment during mated condition that is not interlocked and/or locked condition. As described below, protrusion 7 can be removed from the lock housing 9 inserted into the entrance 18 to dispose a switch 64 and arm the device 3.

Contrastingly in FIG. 6, at step 6/1, the first portion 1 and the second portion 2 have an alignment of the notch 14 with the entrance 18. However, by imparting rotational motion as indicated in step 6/2, marker 16 is returned to alignment with notch 14, and the entrance 18 is no longer aligned with notch 14, such as when un-interlocking the first portion 1 and the second portion 2.

Returning to FIG. 1, generally, a remote control receptor 18 is configured to mate with the remote control 12, and not mate with differently-structured remote controls. Where a magnetic and broadcast unlocking system is employed, receptor 18 can have a broadcast receptor location 20 for receiving a broadcast signal from the remote control 12 and a magnetic field receptor location 22 for receiving a magnetic field from the remote control 12. More specifically, the first portion 1 includes a three-dimensional remote control locator 23 structured such that if a remote control 12 includes a mating three-dimensional locator (not shown in FIG. 1), then the first portion 1 and the remote control 12 are oriented to mate together, and if the remote control 12 does not include the mating three-dimensional locator, then the first portion 1 and the remote control 12 are disoriented from mating together. This feature can be implemented with, or instead of, having a distance on the first portion 1 between the magnetic field locator 22 and the broadcast reception locator 20, the distance matching a distance on the remote control 12 between a magnetic field emitter (not shown in FIG. 1) and a broadcast transmitter (not shown in FIG. 1). A light portal 24 can be located in the first portion 1, which as discussed below, can indicate an armed state of device 3.

In those embodiments in which a remote control 12 is employed, remote control 12 can in some embodiments be operable to turn the armed state of security device 3 to OFF and/or into a STANDBY mode, depending on the implementation of interest. In some embodiments, remote control 12 can also be operable in whole or part to turn the alarm device 3 ON and/or into an activated mode, though use of a protrusion 7 is another approach. Such IR remote controls as can be used in remote control 12 are used in television and cable box switching, and suppliers include Sharp™, LG™, Samsung™ and Comcast™, and ATT™ digital. The remote control 12 illustrated in FIG. 6 has a screw 26 to secure door 28 which accommodates battery replacement. Button 30 initiates the broadcast signal, and for efficiency, the same magnetic field can also be used to unlock a lock in housing 9, if that embodiment is desired. A dual approach to unlocking, e.g., using a coded broadcast and a magnetic field, enables secure possession by only an individual authorized to unlock portion 1 from portion 2.

While many forms of mating can be employed where desired, as illustrated in FIGS. 2, 3, and 4, various portions can be mated by either a male and female intersection or both. Illustratively, FIG. 2 depicts the first portion 1 configured to mate with the second portion 2 by inserting a male section of the first portion 1 into a female section of the second portion 2 and by inserting a male section on the second portion 2 into a female section of the first portion 1. For example, the first portion 1 can have at least one screw notch 32 (female section) to engage at least one screw lip 34 (male section) of the second portion 2 in FIG. 4. Screw notch 32 and lip 34 can mate so that the portions 1 and 2 can subsequently screw-interlock together via the previously described the rotational motion. As best illustrated in FIG. 3, notch 32 can allow lip 34 to be inserted into a portion of notch 32 by a linear motion, and then allow the rotational motion to interlock the portions 1 and 3 via a slotted region 36 that engages lip 34 in the screw-interlocked condition.

Similarly, for example, the first portion 1 can have a generally circular base 76 (male portion) having a diameter less than the diameter of a ring-like structure 37 on the second portion 2, such that some of the first portion 1 fits within the ring-like structure 37 (female portion) of portion 2. The ring-like structures need not be rings, e.g., can be curvilinear section or otherwise facilitate mating by male and/or female intersecting. Additionally, please note that the male/female intersecting can be carried out with either section providing the male structure, and the other section providing the female structure.

The first portion 1 can, if so desired, have a lip-like structure 38 that aligns with another ring-like structure 39 of the second portion 2, to provide stability during the the aforesaid rotation. Again, the ring-like structures need not be rings to facilitate stability, if stability during the rotation is desired in the embodiment of interest. Similarly, if so desired, the first portion 1 can have an outer ring-like structure 40 that tops the second portion 2, after the portions 1 and 2 are interlocked. Yet again, the ring-like structures need not be rings, e.g., can be curvilinear, etc.

If so desired in one design or another, the first portion 1 can include counterdirectional indicators of rotational motion. For example, there can be counter directional arrows 41 with or without such as a lock marker 42 and unlock marker 43, collectively indicating rotational directions for interlocking (and locking) and un-interlocking (and unlocking) portions 1 and 2.

Some embodiments structure the first portion 1 to include friction enhancers rimming the first portion 1 to increase manual gripping when rotational motion is imparted with respect to the first portion 1 and the second portion 1. For example, grippers 44 facilitate manually imparting the rotational motion. In some cases, disguised among the grippers 44 there can be one or more opening(s) 46 that allow the sound of the alarm to better emanate from first portion 1.

FIG. 3 indicates that there is a replaceable battery compartment under door 50, which is secured by screw 52. If desired for one embodiment or another, the first portion 1 can include at least one negative electrode spring 58 or brush or the like, located to communicate electricity to a first conductive surface of the second portion 2, and at least one positive electrode spring 56 or brush or the like located to communicate electricity to a second conductive surface of the second portion 2. More particularly, at least one pair of a positive electrode spring 54 and a negative electrode spring 56, is located to communicate electricity to the second portion 2's inner ring 58 and outer ring 60, via openings 62 and 64, evident in FIG. 4. Other such manner of communicating electricity, such as conductive brushes, can be used. The area of the springs 54 and 56, indeed the use of duplicate springs 54 and 56, help stabilize electrical communication to the rings 58 and 60 while the rings 58 and 60 rotate on spool or wheel 112, e.g., as extension 5 is withdrawn and retracted from the second portion 2.

Returning to FIG. 3, there is a magnetic lock pin 66, which can extend into a recess or indentation 68, shown in FIG. 4, to lock portions 1 and 2 into the combined state with a locked condition and prohibit unscrewing (un-interlocking) engagement of screw notch 32 and screw lip 34. Magnetic lock pin 66 is withdrawn from the indentation 68 by urging from the magnet portion of remote control 12. Thusly, magnetic lock pin 66 is extendable from the first portion 1 into an indentation 68 in or on the second portion 2, i.e., below a bottom cover 76 of the first portion 1, and into an indentation 68 of the first portion 1, the portions 1 and 2 are lockable and unlockable to relock.

FIG. 3 also illustrates switch 70, sometimes referenced herein as the "first switch," that as previously mentioned can be disposed inward by protrusion 6 to arm the device 3. Also illustrated is switch 72, which can be a microswitch and is sometimes referenced herein as the "second switch." As discussed subsequently, microswitch 72 engages with a cap 120 to extend the reach of switch 72.

Returning to FIG. 4, screw notch(es) 32 mate with screw lip(s) 34 enabling the aforesaid rotational motion to locate lips 34 into slotted region 36 to result in the interlocked condition. Note that there can be more than one indentation 68 and notch 14 to allow alternate ways of forming a combination of the first portion 1 and the second portion 2.

Figure 7:
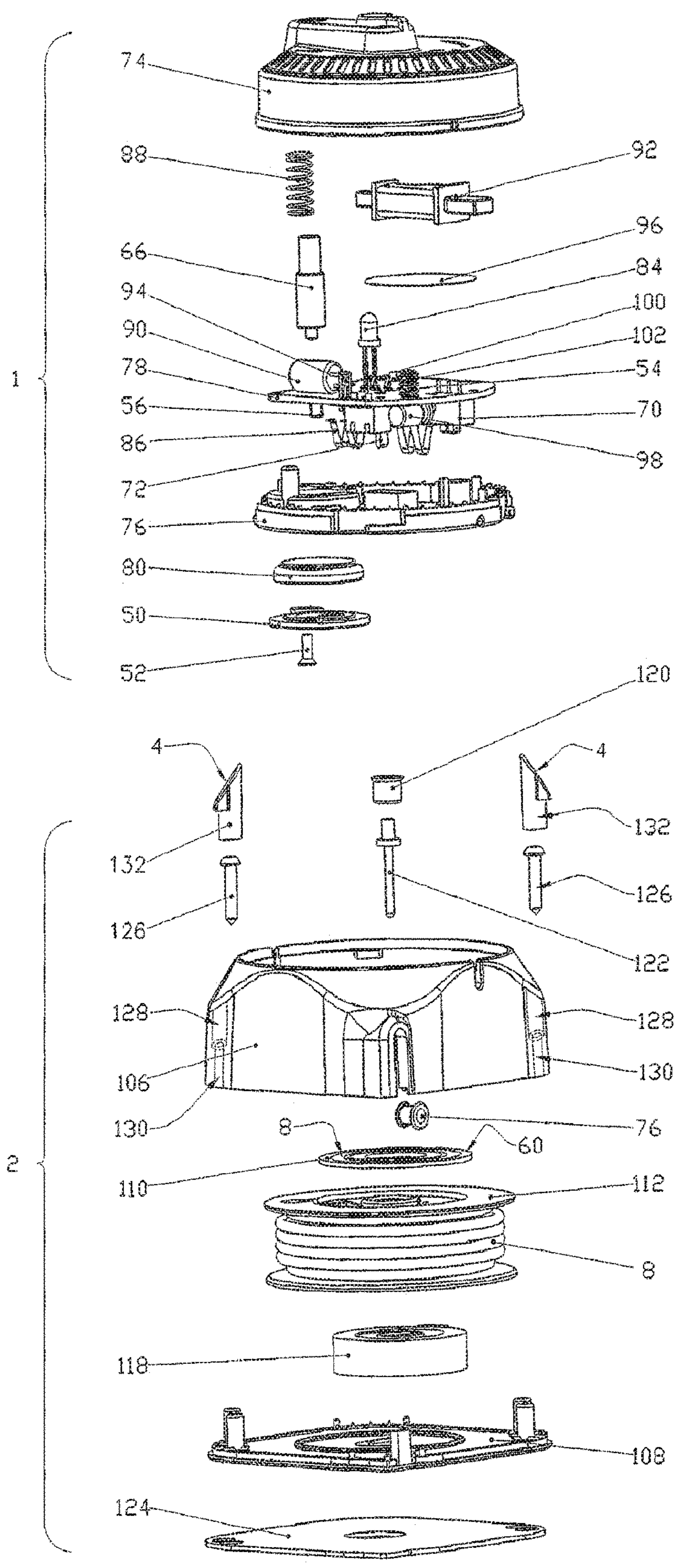
FIG. 7 is an indication of components of the portions of the security device.

Attention in FIG. 7 is drawn to the first portion 1, which can, but need not always, be configured as an alarm unit. For example, a device 3 can be manufactured to have the appearance of an alarm but not be alarmed. A merchant can reduce consumer-theft costs by intermingling alarm devices and unalarmed versions of device 3. However, an alarm device is illustrated in FIG. 7, wherein the first portion 1 can have a top cover 74 and a bottom cover 76. Intermediate the top cover 74 and a bottom cover 76 is at least some circuitry that can, but need not, comprise circuitry on a printed circuit board (PCB) 78, e.g., a PCB having elements on both sides. Upon the PCB 78 can be the first switch 70, having ON and OFF positions. If so desired, the first switch 70 can be disposed so that movement of a switch position to a position more central to the circuit board 76 will turn the power ON for the device 3. In some cases, entrance 18 (FIG. 2) is located and structured to receive and guide the protrusion 7 (or key 180, as subsequently discussed) to dispose the first switch 70 from OFF to ON. Power can be provided by a battery 80, e.g., a replaceable battery, or other power means in other embodiments. For example, the battery 80 can be a 1632 battery. If so desired, the battery 80 can be the same type as the battery used in remote control 12, so that a merchant can purchase only one type of battery for both the device 3 and remote control 12. Battery 80 can communicate with a diode 82 (FIG. 15) to sturdy the voltage from battery 80 in the circuitry.

Also shown is micro-switch 72, i.e., the second switch, operable by a spring-loaded plunger to have an extended position and a retracted position. The extended position can reach farther outwards from printed circuit board 78 than in the retracted position, and when armed, the PCB 78 can respond to a change to the extended position as a breach of the armed state. Thus, for example, if portions 1 and 2 are separated while the device 3 is armed, microswitch 72 will trigger an alarm, discussed below. Thusly, a breach can recognized during the armed condition from a position of a switch (e.g., switch 72) located to detect for the circuitry separation of the first portion 1 and the second portion 2.

Also, if so desired, there can be a third switch 86 or micro-switch, sometimes known as a signal collector or receiver operable to receive a broadcast signal from remote control 12, to turn the alarm unit circuitry OFF or to a standby mode. Remote control 12 can, if so desired, broadcast an infrared code to which the receiver switch 86 is receptive for controlling its switching. Such remote controls and receivers are commonly commercially available, as mentioned above. If so desired, the circuitry of PCB 78 can use an indicator light 84 (e.g., an LED) that can display illumination via light portal 24 in FIG. 1. If so desired, light 84 can illuminate periodically, when the power is ON.

The first portion 1 can be configured to lock to the second portion 2 by a magnetic lock. Within the top cover 74 and bottom cover 76 of the first portion 1, there can be a spring 88 which disposes lock pin 66 so as to operate as a magnetic lock in connection with indentation 68. Spring 88 disposes lock pin 66 downward to engage and lock in the locked condition with the second portion 2 at indentation 68. However, application of a magnet in remote control 12 pulls the lock pin 66 toward the magnet against spring 88, releasing the lock pin 66 from indentation 68, thereby unlocking first portion 1 from second portion 2 into a re-lockable unlocked condition, allowing the lip(s) 32 and notch(es) 34 to unscrew into an un-interlocked condition.

FIG. 7 also shows an inductance device 90. Such devices are commonly available and sometimes known as an "audio push switch adapter." An audio push switch adapter has two different-diameter copper coils and a magnetic bar/ferrite rod 92. These cooperate so that when a control chip 94 (discussed below) sends out a small, pulsing signal, the inductance device 90 transfers the small signal from the control chip 94 into a large signal which drives an alarm 96, e.g., a buzzer wafer, also known as a piezoelectric wafer (e.g., 20 mm), which then produces an alarm sound. Other alarms can be used, e.g., a bell, light, broadcast, indicator, etc.

The circuitry of PCB 78 can include the aforesaid control chip 94, which can be a small IC control chip. Chip logic can be hard wired or implemented with a CPU (e.g., for a computer) and programmable logic or a combination thereof. The chip 94 can be a HS173NS08-.J (available from Shenzhen Bofutong Technology Co., ltd.) or the like. Program logic can, but need not, be such as in FIG. 16.

Returning to FIG. 7, PCB 78 also has a capacitance device 98, for electricity storage, a broadcast receiver 100, such as includes an RF antenna, and spring 102 to communicate electricity from battery 80 to the circuitry of PCB 78. Spring 54, a positive electrode spring or springs, and spring 56, a negative electrode spring or springs, emerge from PCB 78 to communicate electricity respectively to rings 58 and 60, as mentioned above.

Attention is now drawn to the second portion 2 in FIG. 7, which, can but need not always, be configured as a pull box unit. There is a second portion 2 can have a housing 106 having bottom cover 108, and intermediate the second housing 106 and the bottom cover 108 is printed circuit board (PCB) 110 to which the rings 56 and 58 are attached.

PCB 110 is supported on wheel 112 rotatably mounted to bottom cover 110. Onto wheel 112 is spooled extension 5 (and thus line 8) in a pulley arrangement. Line 8 of extension 5 can have wires 173 and 175 (FIG. 11) electrically connected to the printed circuit board 110. Wires 173 and 175 can be soldered or welded such that the wires 173 and 175 are electrically connected to the PCB 110. Accordingly, PCB 110 receives negative and positive electricity from the springs 54 and 56 (duplicated to improve electrical communication over singular springs) via rings 58 and 60 and communicates the electricity via positive wire 173 and to negative wire 175 of line 8 of extension 5. Retraction after extending the line 8, via eyelet 6, can be urged by spiral spring 118.

Cap 120 aligns with a metal pin 122 to collectively slidable locate within second portion 2. In some cases, the cap 120 and pin 122 are withdrawable within the bounds of the second housing 106 and bottom cover 101. But when the first portion 1 is mated with second portion 2, cap 120 engages with a portion of "second switch," microswitch 72. Cap 120 engages to pin 122 so that pin 122 can protrude beyond the bottom cover 108. In this configuration, during removal of the second portion 2 from a surface, pin 122 and cap 120 are no longer disposed toward micro-switch 72, such that when armed, the removal results in a breach of the armed state, triggering the alarm 96 of device 3. In this arrangement, the manner of negating the disposing of pin 122 and cap 120 away from micro-switch 72 can be carried out by gravity, or if so desired, be carried out by spring loading.

A number of configurations are possible for surface mounting portion 2, and one is illustrated as adhesive sticker 124 that can be adhered to the bottom cover 108. Adhesive sticker 124 can have a tabbed cover that is removed to expose an adhesive face which can be employed to adhere the second portion a surface. A central opening in the sticker 124 allows pin 122 to reach the surface to which the adhesive is attached.

Alternatively, or in addition, one or more openings can be provided through second portion 2 to more fixedly attach the second portion 2 than by just relying only on adhesive means. Thus, another configuration for surface mounting second portion 2 includes at least one screw, herein illustrated as two tapping screws 126. Tapping screws 126 are locatable into holes 128 which have a decreased diameter at 130 adjacent bottom cover 108 to allow each head tapping screws 126 to bind second portion 2 to a surface.

In this teaching, if so desired, second portion 2 is outfitable with a cap 4 attached to a plug 132. The cap 4 and plug 132 arrangements can be configured as described above, to conceal (e.g., hide, camouflage, disguise) the existence (or non-existence) of the screws and/or portals for the screws or other securing means. This can be done by having the plug 132 be of a length short enough to fill the remaining portion of hole 128 after screw 126 has been inserted and screwed into the surface, but not long enough that cap 4 protrudes from the surface of housing 106. Also, plug 132 can have a diameter sufficient to mate with each hole 128 so tightly as to interlock, e.g., so as not to freely come out of hole 128. A manner of characterizing mechanical interlocking by compression is that removal of the cap 4 and plug 132 can in some cases produce a “pop” noise. Such mechanical interlocking can be furthered, if so desired, by having a portion of the plug 132 be hollow or deformable, so as to deformable grip within hole 128. Internal ribs to connect to ribs on plug 132 are another approach.

For efficiency, the housing 106 of the second portion 2 can be molded or 3D printed simultaneously with the along with cap 4/plug 132 arrangement to conform well to the housing 106 in color, shape, and/or texture. Where initially produced integral, each cap 4/plug 132 arrangement can be snapped off from the housing 106 if the portion 2 is to be surface mounted by such as screws 118. Thus, in cases when device 3 is secured only by the adhesive pad 124, the cap 4/ plug 132 combination is superfluous (until the device 1 is repurposed and uses the screws 126).

Note that while the cap 4/plug 132 combination and housing 106 can be initially made integral, this need not be the only case. The cap 4/plug 132 combination can be separately produced. In any case, as mentioned above, after tapping screws 118 are located into holes 128 and 130, the cap 4 and plug 132 arrangements can be located into holes 120 to mechanically bind (interlock) with second housing 108, yet conform to the exterior shape, color, etc. of the second housing 108, so as to conceal the existence of tapping screws 118 and/or holes for the screws. The plastic used in the molding can be acrylonitrile butadiene styrene or another thermoplastic and amorphous polymer.

Many, but not all, embodiments can employ one of a variety of extensions 4. To illustrate, consider FIGS. 8-15. First, in FIG. 8, protrusion 7 is structured such that key 180 is a pin. Housing 9 can have a cover 184, e.g., a transparent cover, at an end of the right shell 168 and left shell 170 (collectively forming housing 9) which can be joined by glue, welding, screw, etc. FIG. 8 shows the screw 172, nut 174, magnet 176, lock loophole 10, and lock 178, along with spring 186. Spring 186 assists in the releasing of the pin key 180 once the lock 178 is unlocked. Spring 186 is located above board 188, which can, but need not, be a printed circuit board having an illumination indicator 190 (e.g., an LED) controlled by a chip 192. Spring 186 also can transfer signals from conductive ring 196 (FIG. 11) to circuit board or chip 192. Similarly, conductive spring 194 is located above cylinder lock 178, which is illustrated in greater detail in FIG. 10. Conductive spring 194 can transfer signals from key 180 to the board or chip 192 to ensure a complete circuit between key 180 and conductive ring 196 (FIG. 11).

Figure 16:
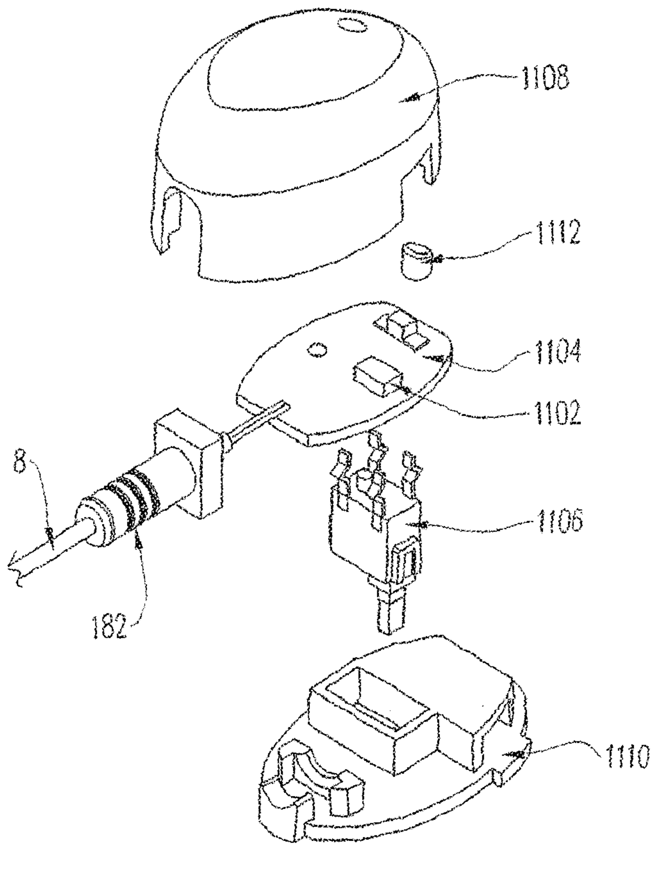
FIG. 16 is an indication of another extension.

In operation, there can be a process of detecting, by alarm device 3, for a change in state, as one but not the only way, to detect a change from the armed state to the unarmed state, as illustrated in FIG. 16. Change such as a change in resistance, a short circuit, a surge, etc., are types of changes in state that can be detected. If an embodiment such as is illustrated in FIGS. 8-13 is employed, the process can also include sending, by alarm device 3, a signal on the line 8 to the light 190 to flash an indication that alarm device 3 is activated. When a magnet, as in remote control 12, opens the lock 178, the process includes disconnecting the conducting ring 196 from conductive spring 186. At the time when pin key 180 disconnects from cylinder lock 178 in an armed state, the process can include interrupting the power in line 8, causing the alarm device 3 to sound the alarm 96.

FIG. 10 illustrates lock 178 in detail. Lock 178 is known as a clutch lock which works like a clutch in a car when it is pushed or released by some force, in this case a magnet such as the magnet of remote control 12 (Figure. 12) is release the pin key 180. Companies providing locks such as lock 178 include TYCO™. (Sensormatic Hard tags), Check Point™. (Alpha Products), Invue CO™, and Oumeisheng Electronic Co., Ltd™. When the key 180 is inserted into opening 177, key 180 will lodge between steel balls 181 to lock firmly there between. When a magnetic key such as in remote control 12 (FIG. 12) is applied to the side 179 of the lock 178 having a securing bowl 183, the magnetic influence of the magnet of remote control 12 will draw the spring 187 toward the magnet of remote control 12, allowing repositioning of the steel balls 181 so that pin key 180 is released.

Further in FIGS. 8-13, illustratively there is a teaching that key 180 is a pin, but it need not be so. The key could be the sort with cuts, tip, and shoulder. However, as illustrated in FIGS. 8-13, the key (pin) 180 can extend from a conductive ring 196, pass within an insulation layer 98, and extend to Copper securing layer 1100, within cover column 182. The extension 5 can, for example, be comprised of a dual core wire (such as Iron and Copper) within the line 8. That is, line 8, e.g., a dual core electrical line which includes Copper branch 173 and an Iron branch 175, can be connected at connection 1113 so that the hon branch 175 is in electrical communication with the Copper securing layer 1100 but not with the conductive ring 196, whereas the Copper branch 173 is in electrical communication with the conductive ring 196 but not with the Copper securing layer 1100 or the Iron branch 175, except with the key 180 in lock 178, as follows. Accordingly, when the key 180 is inserted in lock 178, conductive ring 196 will electrically communicate to the board 188 by the spring 186, while key 180 electrically communicates to board 188 by spring 194 to housing 10, thereby completing the circuit.

When the protrusion 7 and housing 10 are manipulated so that key 180 is inserted into housing 10 (illustrated by a comparison of FIGS. 12 and 13) so that the (pin) key 180 is locked into the lock 178 within housing 110, the line 8 extends to the circuit board 188, which in turn communicates the power to the illumination indicator 190 and the chip 192, and thereby completing the electrical path of line 8. Thus, when the alarm device 3 is activated, removal of the key 180 from the lock 178 will interrupt the power on the line 8, triggering the alarm 96, e.g., to buzz, alarm, ring, etc.

In embodiments utilizing a magnetic lock 178, a magnetic key magnet as in remote control 12 (see, e.g., FIG. 12), one magnet can be used to unlock the protrusion 7 from the lock 178 in lock housing 9 and to unlock magnetic pin 122 from indentation 68. More so, remote control 12 can also provide the broadcast signal to change the state to an unarmed state, such that both the magnetic and broadcast unlocking is necessitated so as not to produce a breach of the armed state.

In operation, there can be a process of detecting, by device 3, for a change in state (e.g., for a breach of the armed state) such as a change in resistance, a short circuit, a surge, etc. If an embodiment such as is illustrated in FIGS. 8-13 is employed, the process can also include sending, by device 3, a signal on the line 8 to the light 190 to flash an indication that device 3 is activated. When a magnet as in remote control 12 opens the lock 178, the process includes disconnecting the conducting ring 196 from conductive spring 1194. At the time when pin key 180 disconnects from cylinder lock 178 in an armed state, the process can include interrupting the power in line 8, causing the alarm device 3 to sound the alarm 98.

Figure 14:
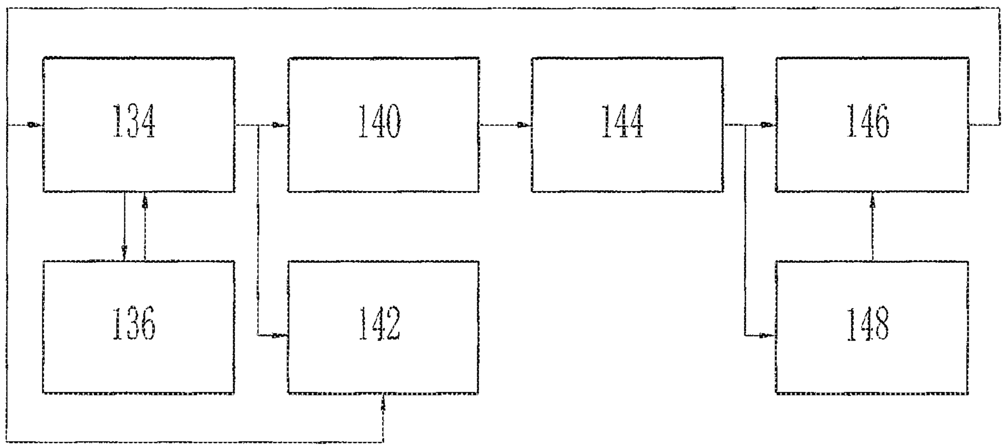
FIG. 14 is an indication of IC program logic.

Turn now to FIG. 14 for an illustrative IC logic flow diagram. When power (e.g., 3 volts) is turned ON for the control chip 94, such that when power (e.g., 3 volts) is turned ON for the control chip 94, in block 134, the logic resets and, in a standby mode, detects to test battery voltage. In block 136, if the voltage is under a threshold, e.g., 3 volts, then inductance device 90 and alarm 96 are triggered into an alarm mode, e.g., driven to sound the buzzing alarm. Blocks 140 and 142 also test for voltage. In block 140, if the second switch 72 is ON and the power is ON in the line 8, then alarm device 3 is in an activated mode. Control chip 94 outputs a signal to make the indicator light 84 illuminate, and if desired, illuminate again every 8-10 seconds while in the activated mode. However, in block 140, if the second switch 72 is not ON and/or there is not power in the line 8, then the logic remains in standby mode, returning to block 142. When the alarm device 3 is activated in block 140, block 144 tests for a change in state, such as the second switch 72 being changed to OFF and/or there being no power in the line 8. If there is a change in state, then inductance device 90 and alarm 96 are driven to trigger the alarm, e.g., buzzing, and if so desired, trigger another alarm indication such as having the indicator light 84 illuminate constantly, (or pulsate multiple times per second, depending on the preferred implementation) etc. Block 146 tests for a broadcast, such as a code, from remote control 12. If the code is recognized by the third switch 86, then the alarm 96 is no longer triggered, e.g., the buzzing of alarm 96 and constant illumination of the illumination indicator 84 will cease. Thusly, the logic from the alarm mode leads to the standby mode and block 142. In block 46, if the code is not received and recognized, then the alarm 96 remains triggered as a breach of the armed state, and such as the buzzing and illumination will continue.

Figure 15:
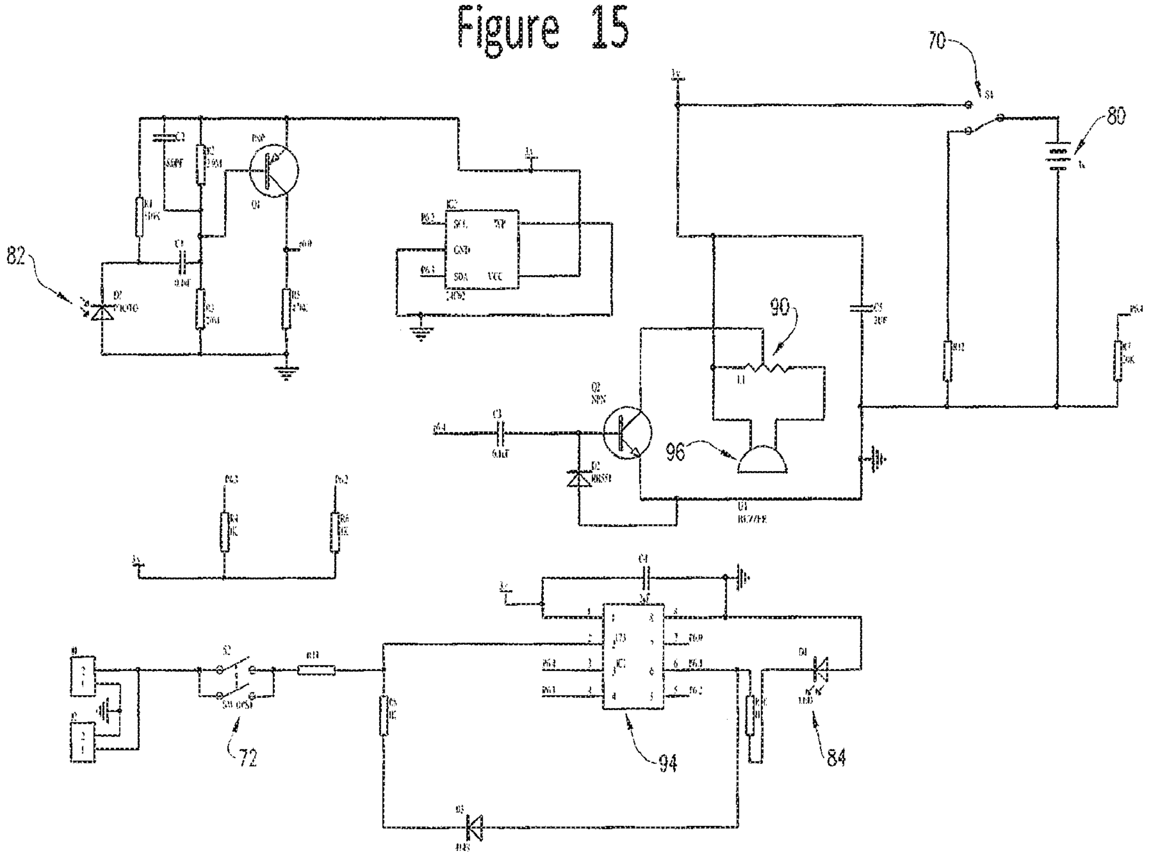
FIG. 15 is an indication of a circuit diagram.

FIG. 15 provides a circuit diagram. Illustrated thereon a first switch 70, a second switch (microswitch) 72, and an infrared receiver as switch 86. Also shown are chip 94, light 84, and alarm 96.

Illustrative of yet another embodiment of protrusion 7 and thus extension 5 is depicted in FIG. 16. FIG. 16 shows line 8 having protrusion 7 powering a circuit board 1102 which controls light 1104 (e.g., an LED). Circuit board 1102 is in communication with switch 1106, such as a spring-loaded microswitch. Switch 1106 can be adhered, mounted, or located adjacent to an article to be protected (not shown), thereby depressing switch 1106 to the ON position. There can be a top cap 1108 connectable to a bottom cap 1110. If so desired, a light pipe 1112 can communicate illumination from the light 1104 to the exterior of the top cap 1108. FIG. 16 illustrates that embodiments need not always have a key 180 connected to extension 5, e.g., where a broadcast from remote control 12 is used to arm the device 3.

In using this embodiment, a process can include depressing switch 1106 to complete the electrical flow in line 8 and allow the circuit board 1102 to send a pulse or otherwise illuminate light 1104, signaling that the protrusion 7 and thus the alarm device 3 are activated. When the alarm device 3 is activated, and switch 1106 is removed from the article (not shown), the process includes spring-loading switch 1106 to the OFF position, thereby interrupting the power in line 8, resulting in alarm device 3 sounding the alarm 98. If so desired, the process can include having light 1104 remain illuminated, rather than pulse as another form of alarm.

Figure 17:
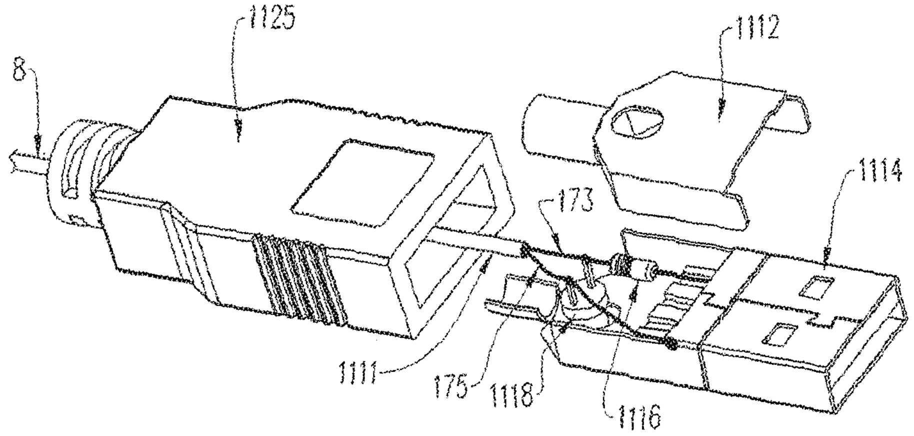
FIG. 17 is y an indication of et other extension.

Yet another embodiment for protrusion 7, and thus extension 5, is illustrated in FIG. 17, which is a plug. Illustratively, the plug can be such as USB or MINI-USB plug, configuration. Cover 1125 is shaped as a cover to a plug which can be made, for example, by plastic injection molding. Protrusion 7 includes an upper metal shell 1112, connected to one of branch of line 8, such as Copper branch 173, and a lower metal shell 1114, connected to another branch of line 8, such as Iron branch 175, assembled such that the circuit for line 8 is completed when the plug shells 1112 and 1114 are inserted in an electrical article (e.g., computer, cellular phone, etc.), apparatus, or other such object. In some cases, conductivity of a female portion (not shown) can complete the flow of electricity in line 8. In other cases, electrical flow from or via the article or apparatus that is to be protected is what is detected by alarm device 3. Depending on the implementation, a resistor 1116 and light 1118 can be used to signal that the alarm device 3 is active. FIG. 15, like FIG. 14, illustrates that key 180 need not always be connected to extension 5, in contrast to the embodiment shown in FIG. 1.

Used in a process, there can be a detecting, by alarm device 3, for a change in electrical state, as discussed above. In the instant embodiment, when the plug shells 1112 and 1114 are removed from the article being protected, the process includes interrupting the power in the line 8, thereby causing the alarm device 3 to trigger the alarm 98.

In some implementations, the alarm device can be structured so that the protrusion is a key which unlocks the first switch to the ON position. In some but not all cases, the key is releasably connectable to the housing by a lock, such as a magnetic lock having a magnetic key. If so preferred, there can be a fourth switch operable to trigger into an OFF position, to interrupt electricity in the wiring, if the protrusion's key is removed from the housing without using the lock key. Various embodiments of the alarm device can be implemented as may be preferred in one application or another. See generally, FIG. 1.

Additionally, there can be a process for manufacturing that includes making a standardized alarm device second portion 2 in quantity, and making quantities of different types of extensions 5 (e.g., FIGS. 1, 16, and 17 for the second portion 2), and combining a the second portion 2 with one of the types of extensions 5 to form different types of articles of manufacture, related by the commonality of the standardized second portion 2. In such a process, the standardized alarm devices 3 have largely identical hardware, but different types of extensions. In these cases, whichever second portion 5 extension is employed, the same first portion 1 can interchangeably be used. This approach efficiently accommodates the different types of extensions 5, but still uses the same detecting of an electrical interruption or change in state by the standardized alarm devices. Similarly, the second portion 2 can be combined different first portions 1, such as when some versions of device 3 are not alarmed and others are alarmed.

Many of the implementations flow from the teachings and principles disclosed herein. Though discussed herein is in the context of an electrical path, it should be understood that the path can instead be a light path (e.g., the extension being a light tube or the like) with the detecting including detecting a change or interruption in the light in the path of light. Thus, depending on the context herein, it should be understood that an electrical interrupt illustratively encompasses a disclosure of refers to a light or other energy interrupt. Also, while discussions herein mention resistance, conductivity can of course be used (i.e., resistance is the reciprocal of conductivity). Depending on the context, negative logic, i.e., testing for ON instead of OFF, power rather than no power, etc., can also be employed, and analog, digital, or a combination thereof are suitable for implementations consistent with the teachings herein.

So for example, one type of extension might employ one of the above-mentioned wiring, housing, and key embodiments (e.g., FIG. 1); another extension might employ wiring connect to an electrical USB, or a MINIUSB plug (as the protrusion) and detect for the interruption in electricity that would occur when the plug is disconnected from a computer or other such electrical device or source (e.g., FIG. 17); yet another extension might employ an additional switch (as the protrusion) that interrupts electricity when the item to be protected is separated from the additional switch, e.g., separating a perfume bottle from the adhesively-attached additional switch (e.g., FIG. 16); and so forth. Yet these extensions can all utilize essentially the same, standardized alarm portion or portions.

Figure 18:
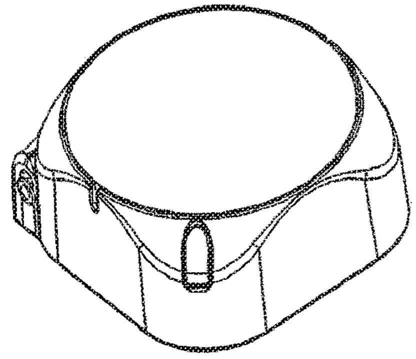
FIG. 18 is an indication of a perspective view of the bottom portion including a cap.
Figure 19:
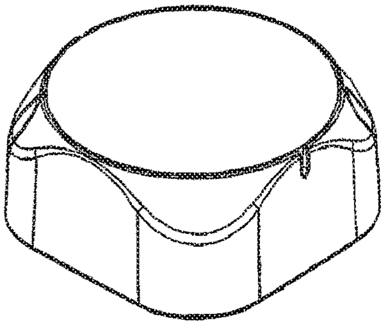
FIG. 19 is an indication of a perspective view of the bottom portion.
Figure 20:
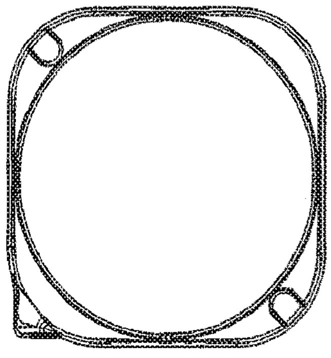
FIG. 20 is an indication of a top view of the bottom portion including a cap.
Figure 21:
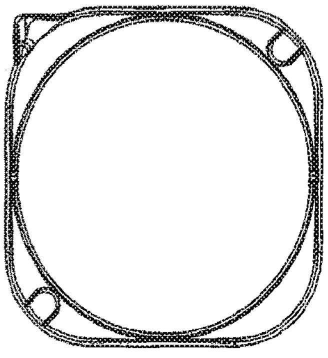
FIG. 21 is an indication of a top view of the bottom portion.
Figure 22:
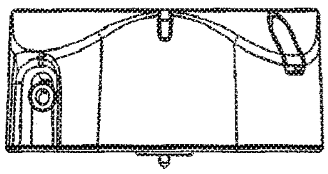
FIG. 22 is an indication of a side view of the bottom portion including a cap.
Figure 23:
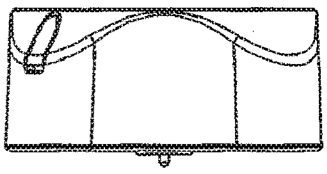
FIG. 23 is an indication of a side view of the bottom portion.

As noted above, there are many designs set out for variations of the teaching example, and any and all of the information FIGS. 1-7 as regards designs is equally applicable to FIGS. 18-23, as may be preferred in one case or another. FIGS. 18-23 illustrate that embodiments can, but need not, include the cap 4, and this is applicable to designs as well—and indeed the cap 4 itself in a design to correspond to the exterior of the second portion 2, as described above. FIG. 18 is a perspective view of the bottom portion including a cap, and FIG. 19 is a perspective view of the bottom portion without the cap. FIG. 10 is a top view of the bottom portion including a cap, and FIG. 11 is a top view of the bottom portion without the cap. FIG. 12 is a side view of the bottom portion including a cap, and FIG. 13 is a side view of the bottom portion without the cap.

In sum, with respect to the description herein, numerous specific details are provided, such as examples of components and/or methods, to provide a thorough teaching and understanding of embodiments and underlying principles. One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Similarly, embodiments can be implemented in many forms, and based on the disclosure and teachings provided herein, a person of ordinary skill in the art will appreciate other ways and/or methods to implement an equivalent. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

It will also be appreciated that one or more of the elements depicted in the drawings/Figures can also be implemented in a more separated or integrated manner, or even removed or rendered as otherwise operable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and the Summary, are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the disclosure herein provided.

The invention claimed is:

1. An anti-theft apparatus comprising:

a first portion of an anti-theft security device, a second portion of the anti-theft security device, or a combination including the first portion and the second portion, the first portion configured to have a separate state with respect to a second portion and a combined state with respect to the second portion, the second portion configured to have the separate state with respect to the first portion and the combined state with respect to the first portion, wherein the first portion and the second portion are each configured such that when in the combined state, the first portion and the second portion are joinable together to collectively form the anti-theft security device with circuitry spanning the first portion and the second portion, the circuitry configured to detect an armed state and to trigger an alarm during a breach of the armed state, and one of the first portion and the second portion includes a wheel or a spool, the wheel or the spool connected to extend and retract an electrically conductive flexible line, and is structured to mount to a surface, and another of the first portion and the second portion contains the alarm, a replaceable battery compartment, or both the alarm and the replaceable battery compartment.

2. The apparatus of claim 1, further including a third portion of the anti-theft security device, wherein the third portion is configured to join with at least one of the first portion and the second portion and is adapted for use as a component or portion of the anti-theft security device.

3. The apparatus of claim 2, wherein the first portion is configured to mate with the second portion by insertion of a male section of the first portion into a female section of the second portion and by reception of a male section on the second portion into a female section of the first portion.

4. The apparatus of claim 3, wherein the first portion is configured to interlock to the second portion by screw interlocking the portions together.

5. The apparatus of claim 4, wherein the first portion is configured to lock to the second portion by a magnetic lock.

6. The apparatus of claim 3, wherein the first portion is configured to lock to the second portion by a magnetic lock.

7. The apparatus of claim 2, wherein the first portion is configured to interlock to the second portion by screw interlocking the portions together.

8. The apparatus of claim 7, wherein the first portion is configured to lock to the second portion by a magnetic lock.

9. The apparatus of claim 2, wherein the first portion is configured to lock to the second portion by a magnetic lock.

10. The apparatus of claim 1, wherein the first portion is configured to mate with the second portion by insertion of a male section of the first portion into a female section of the second portion and by reception of a male section on the second portion into a female section of the first portion.

11. The apparatus of claim 10, wherein the first portion is configured to interlock to the second portion by screw interlocking the portions together.

12. The apparatus of claim 11, wherein the first portion is configured to lock to the second portion by a magnetic lock.

13. The apparatus of claim 10, wherein the first portion is configured to lock to the second portion by a magnetic lock.

14. The apparatus of claim 1, wherein the first portion is configured to interlock to the second portion by screw interlocking the portions together.

15. The apparatus of claim 14, wherein the first portion is configured to lock to the second portion by a magnetic lock.

16. The apparatus of claim 1, wherein the first portion is configured to lock to the second portion by a magnetic lock.

17. The apparatus of claim 1, wherein the electrically conductive flexible line electrically extends adjacent to a lock housing to releasably attach a consumer product.

18. The apparatus of claim 1, wherein the second portion is structured to mount to the surface by an adhesive, at least one screw, or both said adhesive and said at least one screw.

19. The apparatus of claim 1, wherein the anti-theft security device includes both the first portion and the second portion.

20. The apparatus of claim 1, wherein the combined state blocks access to the compartment for battery replacement.

21. The apparatus of claim 1, wherein the circuitry includes a printed circuit board on the first portion, a first switch having ON and OFF conditions; a second switch having an extended position and a retracted position, the extended position reaching farther outwards from the printed circuit board than the retracted position sufficient to detect removal of the second portion from the first portion; and a third switch operable by receipt of broadcast of energy; wherein:

the circuitry is configured to unite cooperation of the first switch, the second switch, the third switch, and the alarm, such that: the circuitry is in the armed state when the first switch is ON and the second switch is in the retracted position, and the alarm is triggered as an undisarmed breach of the armed state when the circuitry detects an electrical change during the armed state, and the circuitry is disarmed by the receipt of the broadcast of energy by the third switch; and the second portion includes a pin extending through the second portion and providing the second switch with a reach sufficient to detect removal of the second portion from a surface.

22. The apparatus of claim 1, further comprising a remote control that includes a magnetic field emitter and a broadcast emitter, the magnetic field emitter located to unlock the magnetic lock, and the broadcast emitter configured to interact with the circuitry to turn the armed state to at least one of: ON; OFF; STANDBY.

23. The apparatus of claim 22, wherein the remote control and the first portion are each configured such that the remote control mates with a three-dimensional remote control locator on the first portion and such that if another remote control does not include the mating three-dimensional locator, then the first portion and the other remote control are disoriented from mating together.

24. The apparatus of claim 22, wherein the remote control and the first portion are each structured such that the magnetic field emitter and the broadcast emitter are spaced by a distance that matches a distance on the first portion between a magnetic field locator and a broadcast reception locator.

25. An anti-theft apparatus comprising:

a second portion of an anti-theft security device, the second portion configured to have a separate state with respect to a first portion and a combined state with respect to the first portion, such that when in the combined state, the second portion is joinable with the first portion to collectively form the anti-theft security device with circuitry spanning the first portion and the second portion, the circuitry configured to detect an armed state and to trigger an alarm during a breach of the armed state, wherein the second portion includes a wheel or a spool, the wheel or the spool connected to extend and retract an electrically conductive flexible line, and is structured to mount to a surface by an adhesive, at least one screw, or both said adhesive and said at least one screw, and the first portion contains the alarm, a replaceable battery compartment, or both the alarm and the replaceable battery compartment.

26. A process of using an anti-theft apparatus, the process including:

combining a first portion of an anti-theft security device, the first portion configured to have a separate state with respect to a second portion and a combined state with respect to the second portion, with the second portion of the anti-theft security device, the second portion configured to have the separate state with respect to the first portion and the combined state with respect to the first portion, wherein the first portion and the second portion are each configured such that when in the combined state, the first portion and the second portion are joinable together to collectively form the anti-theft security device arranged to provide anti-theft protection with circuitry spanning the first portion and the second portion, the circuitry configured to detect an armed state and to trigger an alarm during a breach of the armed state, and one of the first portion and the second portion includes a wheel or a spool, the wheel or the spool connected to extend and retract an electrically conductive flexible line, and is structured to mount to a surface, and another of the first portion and the second portion contains the alarm, a replaceable battery compartment, or both the alarm and the replaceable battery compartment.

27. A process of making an anti-theft apparatus, the process including:

forming a first portion of an anti-theft security device, the first portion configured to have a separate state with respect to a second portion and a combined state with respect to the second portion, or forming the second portion of the anti-theft security device, the second portion configured to have the separate state with respect to the first portion and the combined state with respect to the first portion, or forming both the first portion of the anti-theft security device and the second portion of the security device, the first portion configured to have the separate state with respect to the second portion and the combined state with respect to the second portion, and the second portion configured to have a separate state with respect to the first portion and a combined state with respect to the first portion, wherein the first portion and the second portion are each configured such that when in the combined state, the first portion and the second portion are joinable together to collectively form the anti-theft security device with circuitry spanning the first portion and the second portion, the circuitry configured to detect an armed state and to trigger an alarm during a breach of the armed state, and one of the first portion and the second portion includes a wheel or a spool, the wheel or the spool connected to extend and retract an electrically conductive flexible line, and is structured to mount to a surface, and another of the first portion and the second portion contains the alarm, a replaceable battery compartment, or both the alarm and the replaceable battery compartment.

* * * * *